US007043962B2

(12) United States Patent
Sakai

(10) Patent No.: US 7,043,962 B2
(45) Date of Patent: May 16, 2006

(54) SHEET MATERIAL TYPE DETECTOR

(75) Inventor: Akihiro Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/752,282

(22) Filed: Jan. 5, 2004

(65) Prior Publication Data

US 2004/0139783 A1 Jul. 22, 2004

(30) Foreign Application Priority Data

Jan. 6, 2003 (JP) ............................ 2003-000711

(51) Int. Cl.
*G01M 7/00* (2006.01)
*G01N 3/30* (2006.01)
*G01N 3/32* (2006.01)
*G01P 15/00* (2006.01)

(52) U.S. Cl. .................................................... 73/12.01

(58) Field of Classification Search ............... 73/12.01, 73/159, 105; 602/58; 400/29; 358/1.12, 358/1.9; 347/134; 399/381, 316, 45

See application file for complete search history.

(56) References Cited

U.S. PATENT DOCUMENTS 3,853,055 A * 12/1974 Kolm ......................... 101/316
4,688,423 A 8/1987 Orkosalo
4,809,598 A * 3/1989 Nagumo et al. ............ 100/156
4,862,215 A * 8/1989 Nomura et al. ............. 355/309
5,124,187 A * 6/1992 Aeschbacher et al. ........ 428/40
5,163,759 A * 11/1992 Jambor et al. ................ 400/29
5,335,043 A 8/1994 Kluger et al.
5,499,807 A 3/1996 Nakamura
5,742,318 A * 4/1998 Miyauchi et al. ........... 347/134
5,934,140 A 8/1999 Jackson et al.
6,026,681 A 2/2000 Wunderer et al.
6,668,661 B1 * 12/2003 Rider .......................... 73/762
2003/0053089 A1 * 3/2003 Nojiri et al. ................. 358/1.9
2003/0053090 A1 3/2003 Nojiri et al.

FOREIGN PATENT DOCUMENTS

JP LO H09-040216 2/1997
JP LO H10-006607 1/1998
JP LO H10-329964 12/1998
JP LO 2001-328748 11/2001

OTHER PUBLICATIONS

An English abstract for JPLO 2001-328748.
An English abstract for JPLO H10-329964.
An English abstract for JPLO H10-006607.
An English abstract for JPLO H09-040216.

* cited by examiner

*Primary Examiner*—Max Noori
*Assistant Examiner*—Octavia Davis
(74) *Attorney, Agent, or Firm*—Morgan & Finnegan, L.L.P.

(57) ABSTRACT

A sheet material type detecting method for detecting a sheet material type has the steps of applying tension to at least a part of a sheet material, bounding an impact applying part on the part applied with the tension, a period detecting step of determining a period from a collision of the impact applying part with the sheet material to a specific state, and a sheet material identifying step of detecting a type of the sheet material based on the period.

5 Claims, 6 Drawing Sheets

B1
B2
B3
B4
V
TIME

V
TIME
C

D
V
TIME

E
V
TIME

SHEET MATERIAL TYPE DETECTOR

BACKGROUND OF THE INVENTION

1. Field of the Invention

The present invention relates to a sheet material type detecting method for detecting the type of a sheet material, a sheet material type detector and an image forming apparatus.

2. Related Background Art

Conventionally a method for detecting a sheet material type (including a paper medium and a transparent resin sheet) in an image forming apparatus such as a copier, a printer and a facsimile is proposed in U.S. Pat. No. 6,097,497.

In a method for detecting a sheet material type, some kind of numeric code or symbol is affixed beforehand to a sheet material, information including the numeric code is read by a sensor provided in a printer, and the printer uses the information to optimize a print mode (hereinafter, referred to as a "marking scheme").

However, in the marking scheme, it is not possible to identify a sheet material type when a numeric code or the like is not affixed on the sheet material.

SUMMARY OF THE INVENTION

An invention of the present invention is to provide a sheet material type detecting method, a sheet material type detector and an image forming apparatus whereby the type of a sheet material can be detected without decreasing the printing speed of the image forming apparatus even when information such as a numeric code is not affixed to the sheet material beforehand.

According to the present invention, a sheet material type detecting method for detecting a sheet material type, comprising:

a tension applying step of applying tension to at least a part of the sheet material, a bounding step of bounding an impact applying part on the part applied with the tension, a period detecting step of determining a period from the collision of the impact applying part with the sheet material to a specific state, and a sheet material identifying step of detecting the type of the sheet material based on the period.

According to a second invention of the present application, a sheet material type detector for detecting a sheet material type, comprising:

tension applying means for applying tension to at least a part of the sheet material, impact applying part for bounding an impact applying part on the part applied with the tension on the sheet material, a sensor for detecting timing of colliding the impact applying part with the sheet material, period detecting means for determining a period from the collision of the impact applying part with the sheet material to a specific state, and type detecting means for detecting the type of the sheet material based on the detection result of the period detecting means.

A third invention, comprising the sheet material type detector as mentioned above and an image forming section for forming the most suitable image based on the detection result of the detector.

DESCRIPTION OF THE PREFERRED EMBODIMENTS

Referring to FIG. 1A to FIG. 4, the embodiment of the present invention will be described below.

A sheet material type detecting method is a method for detecting a sheet material type, the method comprising:

a tension applying step of applying tension to at least a part of a sheet material P (hereinafter, referred to as a "sheet tension part"), a bounding step of bounding an impact applying part 1 on the sheet tension part A, a period detecting step of determining a period from the collision of the impact applying part 1 with the sheet material P to a specific state, and a sheet material identifying step of detecting the type of the sheet material P based on the period (hereinafter, referred to as a "bouncing period").

Figure 1A:
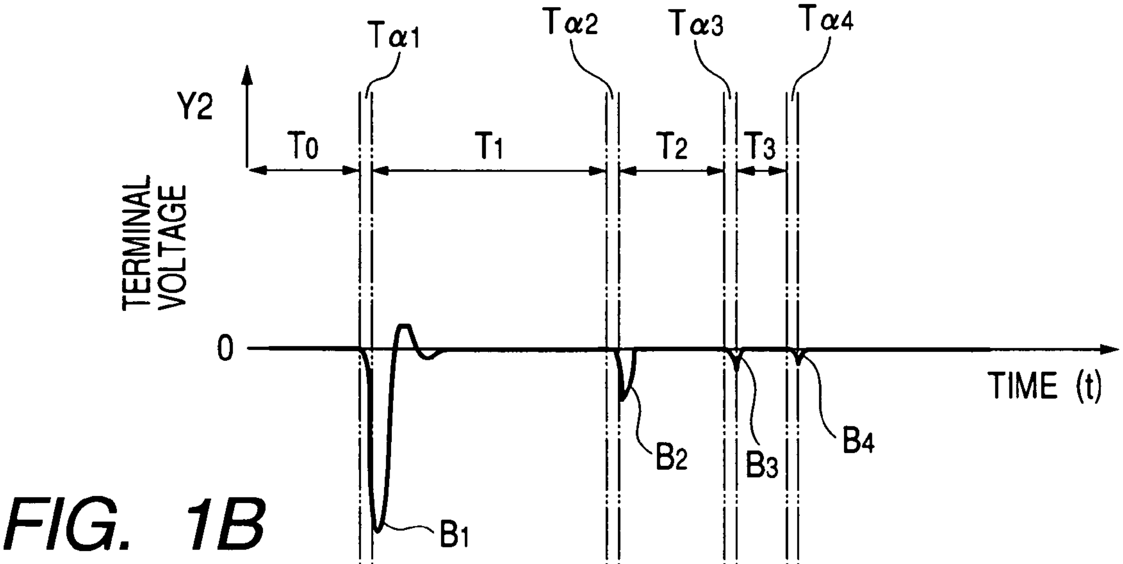
FIG. 1A and FIG. 1B are schematic diagrams for explaining the principle of a sheet material detecting method according to the present invention.
Figure 1B:
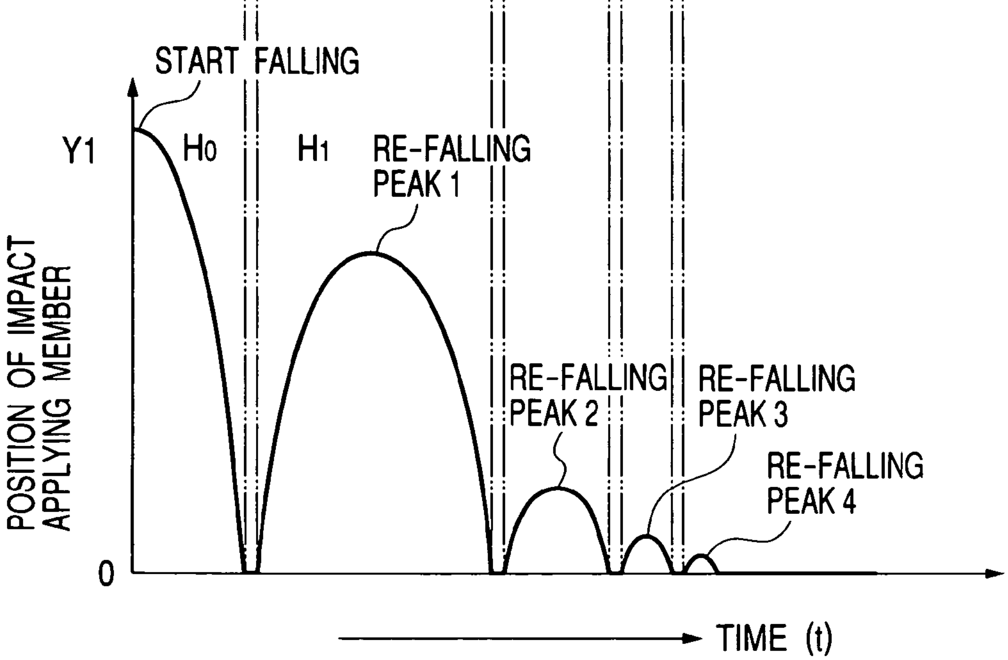
Figures 3A, 3B, 3C, 3D:
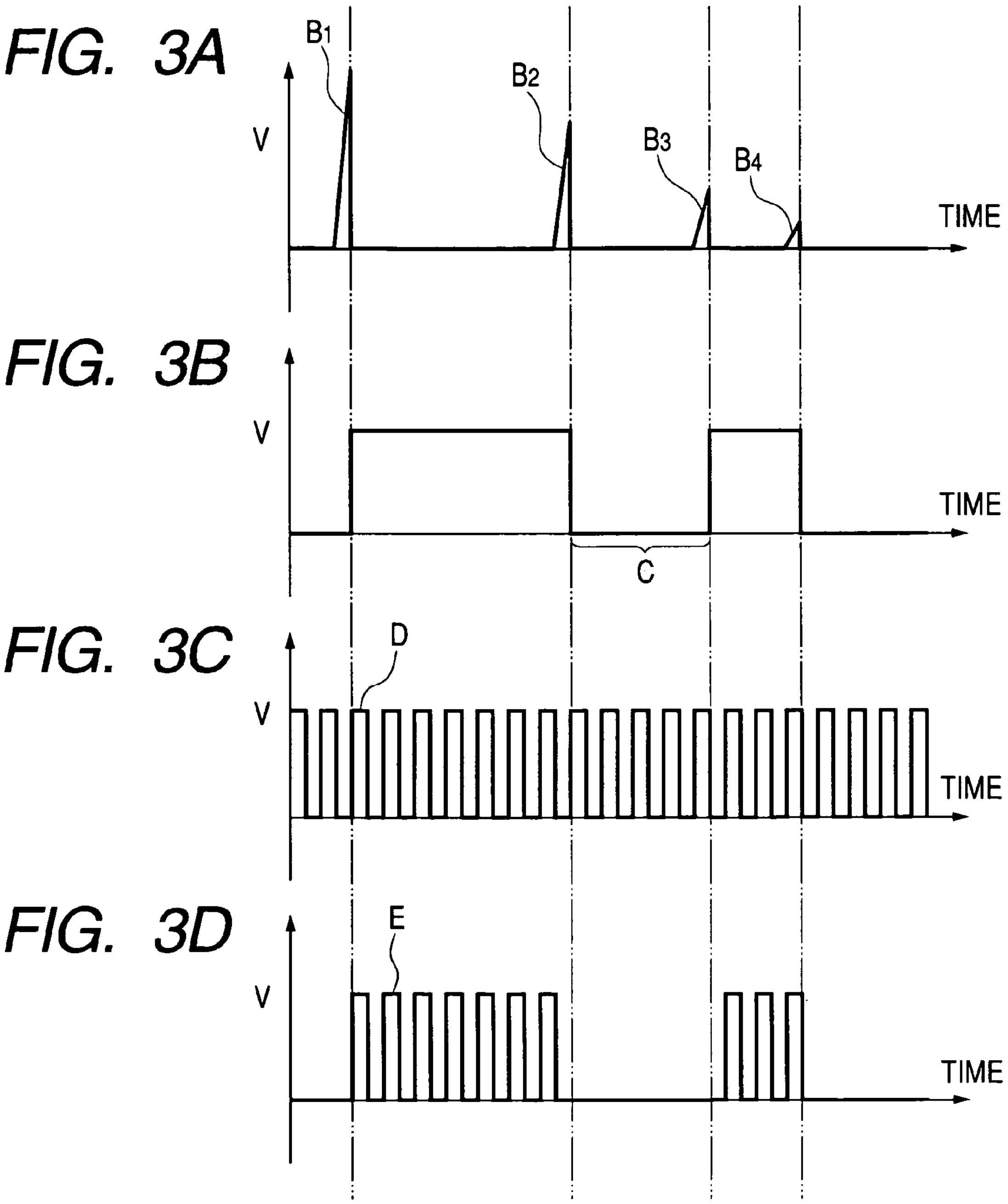
FIG. 3A, FIG. 3B, FIG. 3C and FIG. 3D are waveform charts for explaining a method of measuring a bouncing period.

The bouncing period includes:

a period during which the impact applying part 1 stays in the air after colliding with the sheet material P (reference character $T_1$ in FIG. 1A and FIG. 1B), a period from one collision to another of the impact applying part 1 with the sheet material P (that is, a period from nth collision to mth collision where n represents an integer of 1 or larger, m represents an integer of 2 or larger, and m>n is established, see reference characters $T_{\alpha 1}+T_1$ in FIG. 1A and FIG. 1B), and a period from the first collision of the impact applying part 1 to a static state (reference characters $T_{\alpha 1}+T_1+T_{\alpha 2}+T_2+T_{\alpha 3}+T_3+\ldots$). For example, time required from the first collision to the fifth collision and time from one collision to another of the impact applying part 1 with the sheet material P are measured and a sheet material type can be decided based on the time. Further, from the nth collision to the n+1th collision, a predetermined pulse C is generated as shown in FIG. 3B, and the bouncing period can be measured based on the number of clock pulses generated in an AND circuit, as to the pulse C and an external clock pulse (reference character D of FIG. 3C) of a known frequency (FIG. 3D).

It is preferable that timing of colliding the impact applying part 1 with the sheet material is detected by a sensor 2 and the period is determined based on the detection result of the sensor 2. In this case, it is preferable to detect timing of colliding the impact applying part 1 with the sheet material based on the maximum value (reference characters $B_1$, $B_2$, . . . of FIG. 1A) of the output signal of the sensor 2.

The sheet material detector of the present invention will be discussed below.

Figure 2:
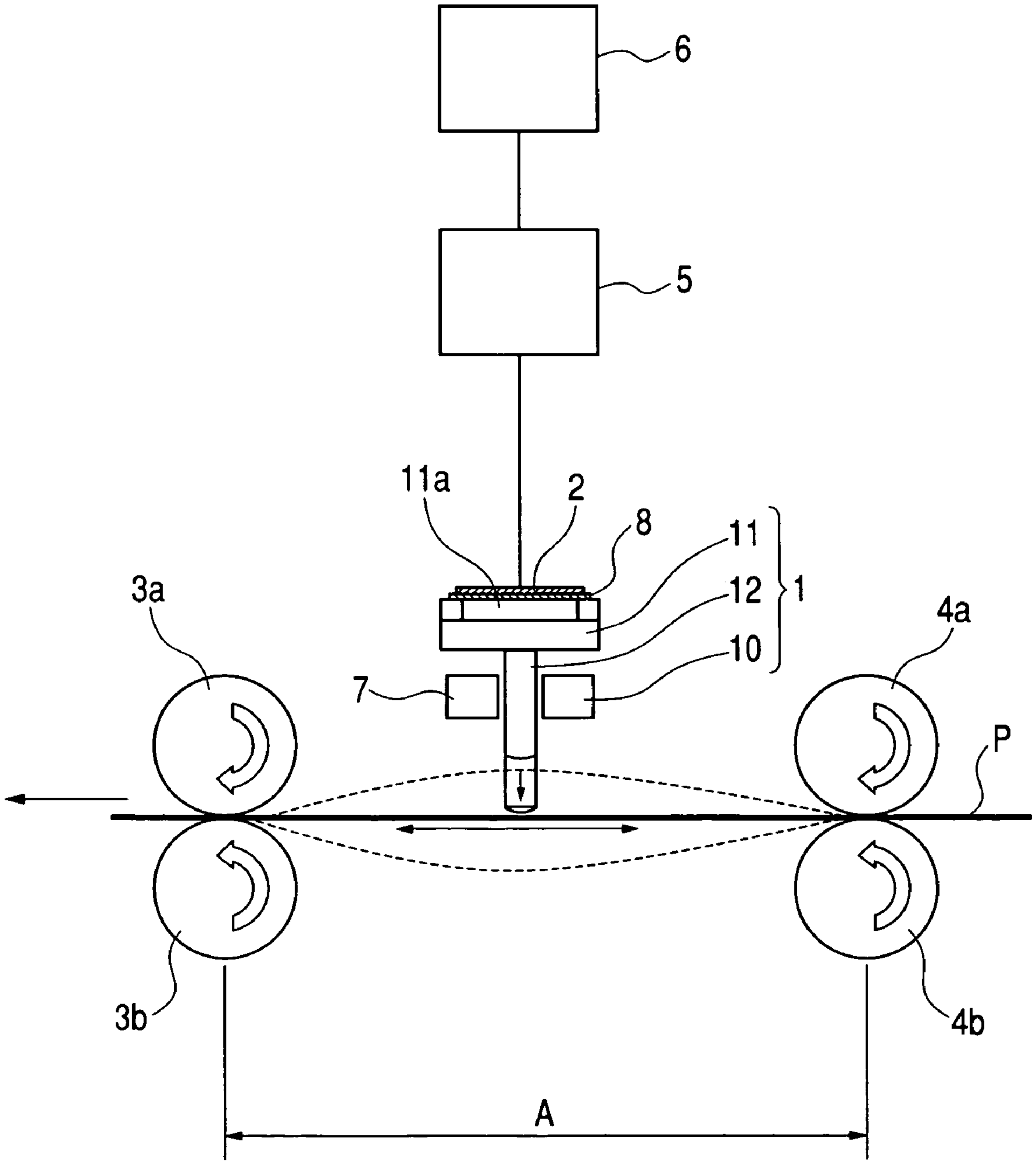
FIG. 2 is a schematic diagram showing the configuration of a sheet material detector according to the present invention.

The sheet material detector of the present invention is a detector for detecting the type of a sheet material. As shown in FIG. 2, the detector comprises tension applying means 3*a*, 3*b*, 4*a* and 4*b* for applying tension to at least a part A on the sheet material P, an impact applying part 1 which is bounded on the part A applied with the tension on the sheet material, a sensor 2 for detecting timing of colliding the impact applying part 1 with the sheet material, period detecting means (hereinafter, referred to as a "bouncing period detecting section") 5 for determining a period from the collision of the impact applying part 1 with the sheet material to a specific state, and type detecting means 6 for detecting the type of the sheet material based on the detection result of the bouncing period detecting section 5.

The sensor 2 includes a piezoelectric element held by the impact applying part 1 in a deformable manner (that is, a piezoelectric element which is held in a deformable manner, is deformed in response to the collision of the impact applying part 1 with the sheet material P, and outputs a signal).

It is preferable that the impact applying part 1 is constituted of an impact part 10 colliding with the sheet material P, a movable base 11, and a movable shaft 12 connecting the movable base 11 and the impact part 10. Further, it is preferable to dispose a bearing 7, which holds the movable shaft 12 movably in the uniaxial direction, and an elastic deformable member 8 supported on the movable base, and to place the piezoelectric element, which serves as the sensor 2, on the elastic deformable member 8.

Further, it is necessary to provide a space 11*a* between the movable base 11 and the elastic deformable member 8 to enable the deformation of the elastic deformable member 8.

Moreover, at least two pairs of transporting means for transporting a sheet material can be used as the tension applying means 3*a*, 3*b*, 4*a* and 4*b*. In this case, it is preferable that tension is applied to a sheet material between the transporting means by setting the transporting speed of the transporting means 3*a* and 3*b*, which are disposed upstream from a direction of transporting the sheet material, higher than that of the transporting means 4*a* and 4*b*, which are disposed downstream from the direction of transporting the sheet material.

The elastic deformable member 8 may be held under a reduced pressure.

Further, the elastic deformable member 8 may be subjected to natural vibration in the bouncing period.

The following operations are also applicable: the vibration of the elastic deformable member 8 is detected by a change in piezoelectric current, the piezoelectric current is subjected to voltage conversion, the voltage is selected at a comparison voltage or higher which is set in a comparator, a signal is converted into a pulse, the pulse is counted by a counter from the collision to the set time, and the sheet material is detected.

The elastic deformable member 8 only has to be supported so as to be deformed by the collision. Therefore, the elastic deformable member 8 may be supported on both sides (FIG. 2), cantilevered, or fixed in a surrounded manner. A plate spring and a coil spring are both applicable. The sensor 2 only has to be disposed on a position permitting the detection of deformation on the deformable member and thus the sensor 2 is not limited to the above-described configuration.

The type detection of the present invention includes: the identification of sheet materials having different components and surface conditions, the detection of a thickness of the sheet material regardless of whether components are different or not, and so-called multifeeding (e.g., two or more overlapping papers of a sheet material are transported in a printer).

The present invention detects the bouncing period of the impact applying part by using the vibration of the elastic deformable member, the vibration being generated by the collision of the impact applying part with the sheet material.

Figure 4:
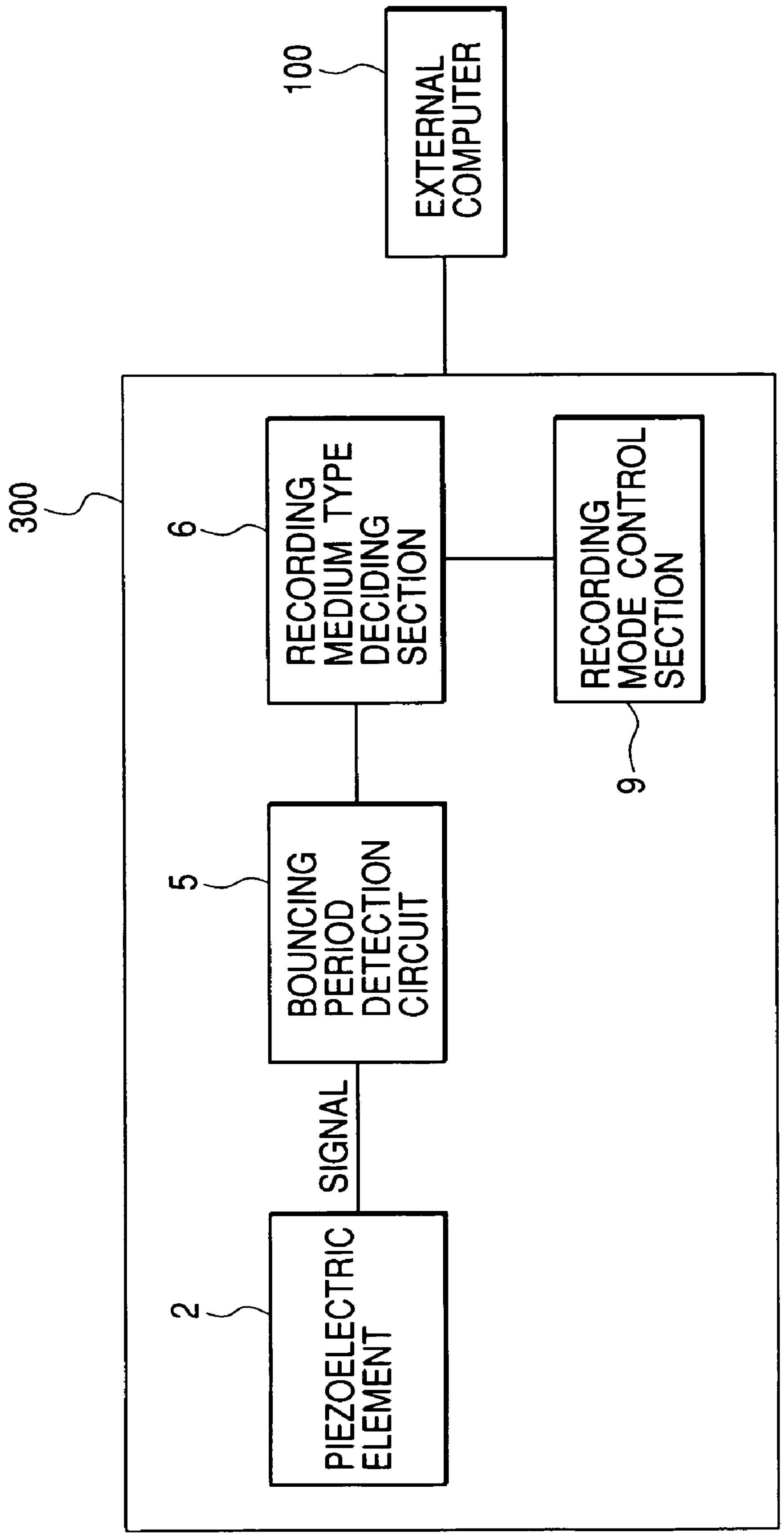
FIG. 4 is a block diagram showing the configuration of an image forming apparatus according to the present invention.

Further, the image forming apparatus may be constituted of the sheet material type detector configured thus and an image forming section (not shown) for forming the most suitable image based on the detection result of the detector. FIG. 4 schematically shows the configuration of a printer 300. A signal from the sensor (e.g., a piezoelectric element) 2 is inputted to a bouncing period detection circuit (bouncing period detecting section) 5 to detect a period and then a sheet material type is decided through a type deciding section (type detecting means) 6 which has stored a data table (data table for storing beforehand bouncing periods corresponding to kinds of sheet material). Thereafter, printing is performed by a recording mode control section 9 in the most suitable mode. Besides, a sheet material type may be decided, by using a signal from the bouncing period detecting section, in an external computer 100 (connected to the printer) instead of the printer. In this case, a recording mode control signal is transmitted from the external computer 100 to the printer 300. Further, a sheet material type may be decided for each sheet or every predetermined number of sheets, the number being set beforehand or determined by the user. Detection may be performed only when the main power supply of the printer is turned on. In this way, the data table having stored bouncing periods corresponding to kinds of sheet material is provided in the printer or the computer connected to the printer, and information detected by the bouncing period detecting section 5 is compared with and the data table so as to identify the kind of sheet material. After the sheet material is identified, a printing mode can be set in the printer or from the computer connected to the printer. The setting of a printing mode includes control on a discharge amount of ink. Manual setting and automatic setting are both applicable.

In the present invention, the types of sheet material include plain paper, coated paper, glossy paper, OHP paper or include thicknesses. All of the types can be identified by providing the data table beforehand.

Additionally, in a method of falling the impact applying part, an impact may be applied by spring force instead of simply using gravity (not shown).

The effect of the present embodiment will be described below.

According to the present embodiment, the type of a sheet material can be detected even when no numeric code is affixed.

EXAMPLES

The present invention will be described in detail in accordance with an example.

Example 1

Figure 5:
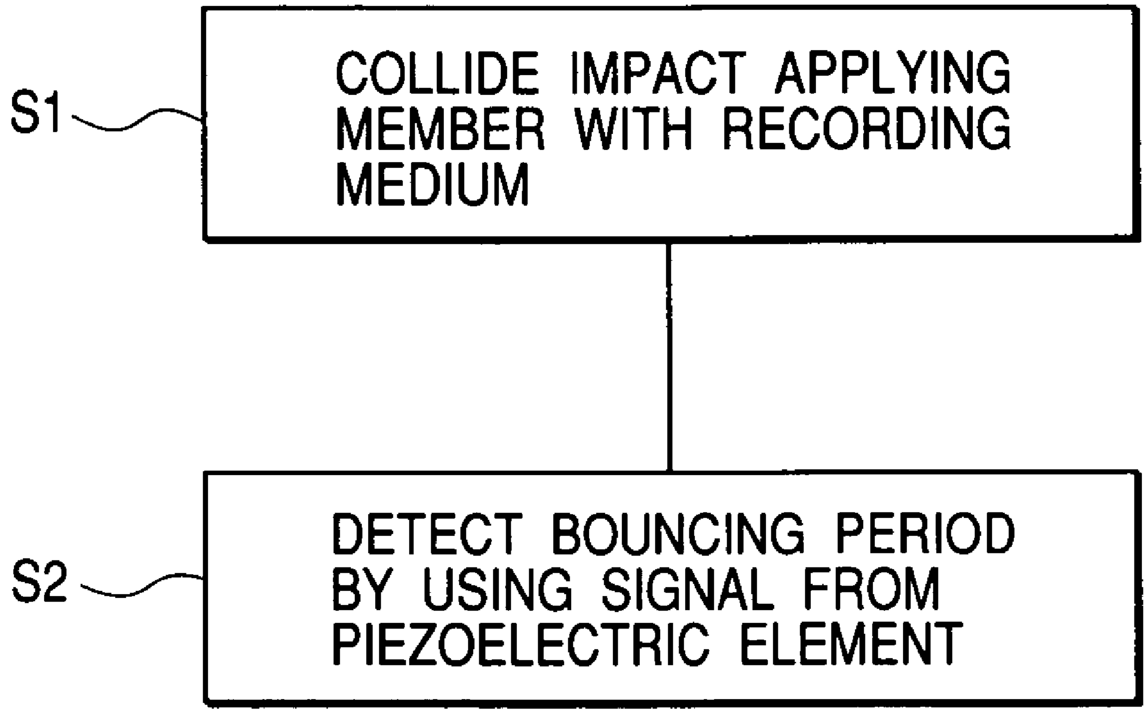
FIG. 5 is a flowchart for explaining a sheet material detecting method.

Referring to FIG. 5 and so forth, the example of the present invention will be discussed below.

First, an impact applying part 1 is caused to collide with a sheet material (recording medium) (S1 of FIG. 5). A signal is outputted from a piezoelectric element 2 by the collision and thus the bouncing period of the impact applying part 1 is detected by using the signal (S2). The detected value and a data table stored beforehand (the data table stores beforehand bouncing periods corresponding to kinds of sheet material) are compared with each other, so that a sheet type can be identified.

Referring to FIG. 2, the following will discuss the structure of a sheet material type detector used in the present example.

In FIG. 2, reference numeral 2 denotes the piezoelectric element serving as a sensor. Reference numeral 8 denotes an elastic deformable member (e.g., plate spring) having the piezoelectric element 2 thereon. Reference numeral 11 denotes a movable base for fixing the elastic deformable member 8 on a pedestal. Reference numeral 11*a* denotes a groove which is formed in the movable base 11 to enable the elastic deformable member 8 to be deformed and displaced. Reference numeral 12 denotes a movable shaft connected to the movable base 11. Reference numeral 10 denotes a hemispherical impact part provided on the tip of the movable shaft 12. The movable base 11, the movable shaft 12, and the impact part 10 are integrally formed and constitute an impact applying part (may be constituted of separable members). Reference numeral 7 denotes a bearing for smoothly moving the movable shaft 12 in the uniaxial direction.

Elastic rubber rollers with large friction coefficients are used as transport rollers (transporting means) 3*a*, 3*b*, 4*a* and 4*b*. One side of a sheet material P is nipped by the transport rollers 3*a* and 3*b* and the other side is nipped by the transport rollers 4*a* and 4*b* with a predetermine pressure (hereinafter, referred to as nip pressure).

The plurality of transport rollers 3*a*, 3*b*, 4*a* and 4*b* are rotatively driven by the power of the detector to transport the sheet material P.

In the present example, the target speed of transporting a sheet material is 100 mm/s. The number of revolutions of the transport rollers 3*a* and 3*b* is determined so as to have a speed of 100 mm/s.

On the other hand, the transport rollers 4*a* and 4*b* are set so as to rotate at a speed reduced by several percents and are nipped with a nip pressure lower than that of the transport rollers 3*a* and 3*b*. Thus, the sheet material P is transported at the rotation speed of the transport rollers 3*a* and 3*b* (that is, a transporting speed of 100 mm/s). The sheet material nipped between the transport rollers relatively different in the number of revolutions are moved and transported while maintaining tension.

Figure 6:
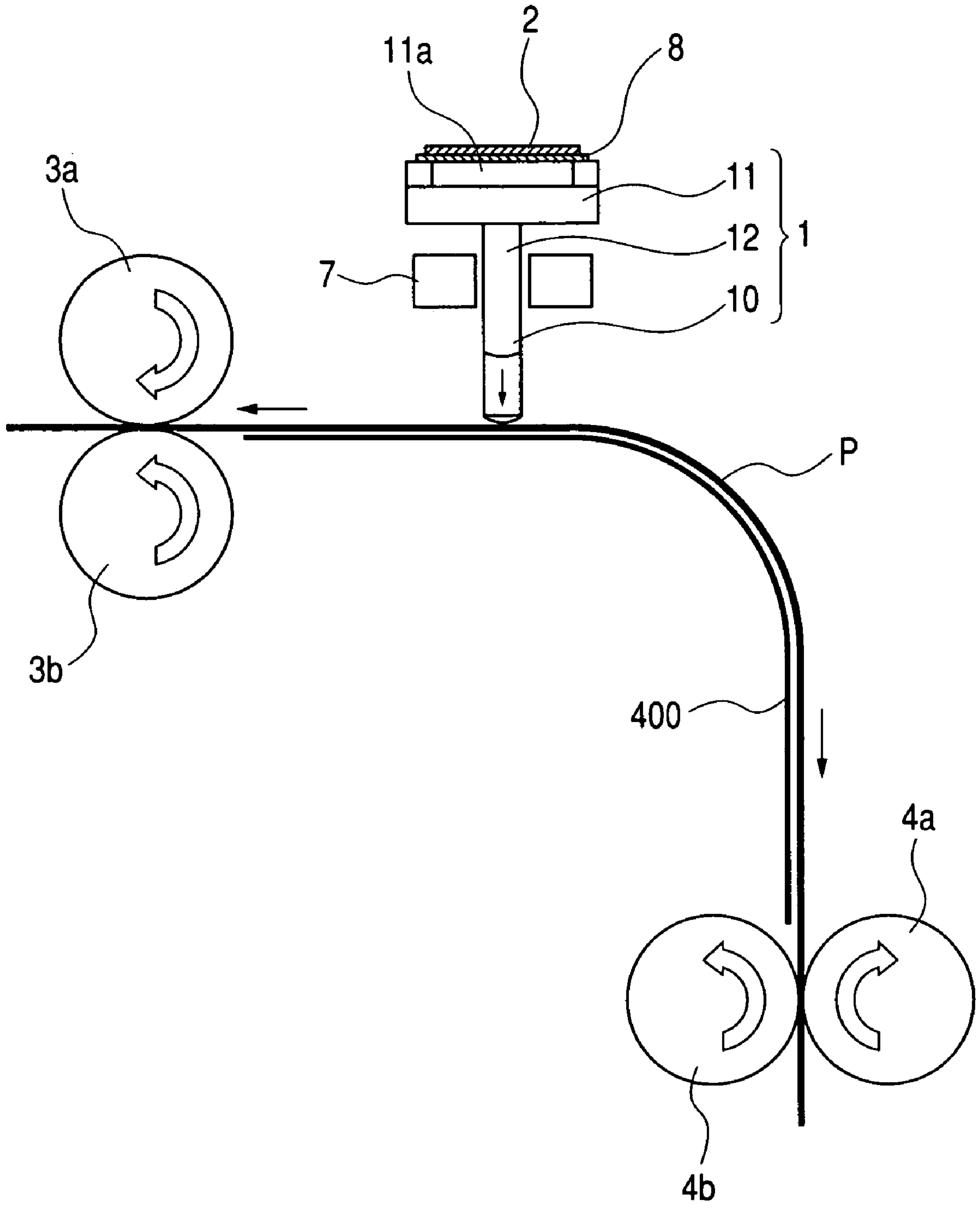
FIG. 6 is a schematic diagram showing another example of the configuration of the sheet material detector according to the present invention.

In FIG. 2, a sheet tension part A is not bent but is shaped like a plain surface. The same effect can be obtained by, as shown in FIG. 6, providing a bend guide 400 between the transport rollers and applying tension to the sheet material P along the bend guide 400 (a bend guide impact part has a hole and the sheet material can vibrate). Moreover, the same effect can be obtained by applying tension while the sheet material is stopped. In this case, the rotations of the transport rollers 4*a* and 4*b* are fixed and the transport rollers 3*a* and 3*b* are rotated in a direction of applying tension on the sheet material (in the opposite direction).

The operations of the present example will be discussed below.

When the impact applying part 1 is dropped onto the sheet material P, the impact applying part 1 repeatedly bounds on the sheet material P and finally come to rest. When the impact applying part 1 bounds, the plate spring (elastic deformable member) 8 is distorted, and the piezoelectric element 2 is deformed and outputs piezoelectric current. At this point, the magnitude of the piezoelectric current is proportionate to a strain rate. Thus, at the moment when the impact applying part 1 collides with the sheet material P, the strain rate has the maximum value and the piezoelectric current (voltage V is generated on both poles of the piezoelectric element in proportion to the piezoelectric current) also has the maximum value. The piezoelectric current is picked up as a voltage signal from both poles of the piezoelectric element based on the internal impedance of the piezoelectric element. Therefore, a bouncing period can be determined based on timing of detecting such a maximum value signal and the type of the sheet material can be detected. A detailed explanation will be given below.

When the movable base 11 is dropped from a height $H_0$ to the tension part A, as shown in FIG. 1B, the impact part 10 collides with the sheet material P after time $T_0$, and the impact part 10 bounds after a deformation (plastic deformation and elastic deformation) period Tα1. Thereafter, the impact part 10 bounds up to a height $H_1$ along the bearing 7, which permits movement in the uniaxial direction, and the movable base 11 integrated with the impact part 10 starts falling again and collides with the sheet material P again. Then, the impact part 10 bounds again after a deformation period Tα2 of the sheet type and finally comes to rest after repeating the above movements.

In the process where the impact applying part 1 gradually bounds lower and lower, the plate spring 8 is changed in kinetic momentum by the impulse of the collision of the movable base 11 (including the piezoelectric element 2, the plate spring 8, the movable shaft 12 and the impact part 10) with the sheet material P. That is, the plate spring 8 is placed from a static state into a moving state and starts vibrating. The vibration decreases in vibration amplitude due to rapid attenuation made by the viscous drag of a plate spring vibration system and the plate spring 8 is temporarily stopped in the final stage. A piezoelectric signal is outputted from the piezoelectric element 2 according to the distortion of the plate spring (FIG. 1A). Thereafter, in a process of repeating the above-described collision and dropping, rapid vibration damping is repeated which is caused by rapid distortion and deformation and the viscous drag of the plate spring vibration system. Since the tension part A is applied with a given tension as described above, the piezoelectric signal corresponds to the quality and thickness of the sheet material.

Then, in elapsed time after the impact applying part falls as shown in FIG. 1A and FIG. 1B, a sheet type can be detected by measuring time intervals between the maximum signals of voltage generated on the piezoelectric element 2 upon collision. In this case, a difference in deformability or stiffness for each sheet type is used.

The time for measurement includes:

time when the impact applying part 1 bounces up (that is, T1 of FIG. 1A and FIG. 1B)

time from the first collision to the third collision of the impact applying part 1 (that is, T1+T2 of FIG. 1A and FIG. 1B)

time from the first collision to the fourth collision of the impact applying part 1 (that is, T1+T2+T3 of FIG. 1A and FIG. 1B)

A sheet type may be specified by performing data processing using the measurement time (for example, in the data processing, bouncing period data for each sheet material is stored beforehand, and a comparison is made to decide whether measured data agrees with a measured value or which sheet material type is close to the value. At this point, a data table including parameters of humidity and temperature may be stored at this point of time and a humidity and a temperature may be measured to decide a sheet material type). When a sheet type is detected, the sheet material may substantially remain at rest (the sheet material is not transported in the printer and its transportation is stopped, before the start of transportation or after the completion of transportation) or a sheet type may be detected during the transportation of the sheet material (that is, during the movement).

What is claimed is:

1. A sheet material type detector for detecting a sheet material type, comprising:

tension applying means for applying tension to at least a part of a sheet material with at least two pairs of transporting means each disposed along the sheet material wherein tension is applied by setting a different transporting speed for each of the at least two pairs of the transporting means;

an impact applying part for applying an impact on the part applied with the tension on the sheet material;

a piezoelectric element held by the impact applying part in a deformable manner; and type detecting means for detecting a type of the sheet material based on a signal output from the piezoelectric element.

2. The sheet material type detector according to claim 1, wherein the tension applying means is at least two pairs of transporting means for transporting the sheet material, and tension is applied to the sheet material between the transporting means by setting a transporting speed of the transporting means, which are disposed upstream from a direction of transporting the sheet material, higher than that of the transporting means disposed downstream from the direction of transporting the sheet material.

3. A signal output apparatus comprising:

a tension applying part for applying tension to a sheet material with at least two pairs of transporting devices each disposed along the sheet material and configured to apply tension to the sheet material by setting a different transporting speed for each of the at least two pairs of the transporting devices;

an impact applying part for applying an impact on the sheet material; and a signal output part being provided with the impact applying part, for outputting a signal in accordance with the collision of the impact applying part with the sheet material.

4. The signal output apparatus according to claim 3, wherein the signal output part co-operates with the impact applying part.

5. An image forming apparatus comprising the signal output apparatus according to claim 3.

* * * * *